3,060,205
PROCESS FOR PREPARATION OF 3-AMINO-
1,3,5(10)-ESTRATRIENE DERIVATIVES
Erwin Schwenk, Shrewsbury, Mass., and Allen M. Gold, New York, N.Y., assignors to The Worcester Foundation for Experimental Biology, Worcester, Mass., a corporation of Massachusetts
No Drawing. Original application Apr. 27, 1960, Ser. No. 24,915. Divided and this application Jan. 16, 1962, Ser. No. 166,717
3 Claims. (Cl. 260—397.5)

This invention relates to novel, therapeutically active amino steroids and derivatives thereof and to methods for their preparation. More specifically, our invention relates to aminoestratrienes and, in particular, to 3-amino-1,3,5(10)-estratrienes which possess an oxygen function at C–17, and to the derivatives thereof.

The novel aminoestratrienes of our invention are represented by the following formula; and include their salts with acids:

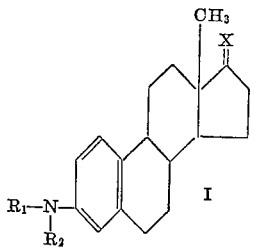

wherein X is a member of the group consisting of O, (H,βOZ), (α-methyl,βOZ), and (α-ethinyl,βOZ) wherein Z is a member of the group consisting of H and acyl; and $R_1$ and $R_2$ may be the same or different and are members of the group consisting of H, lower alkyl, benzyl or acyl.

By the term acyl is contemplated acid radicals of hydrocarbon carboxylic acids preferably having up to eight carbon atoms. Included in this group are aromatic acids exemplified by benzoic acid or alkyl substituted benzoic acids and, preferably, lower alkanoic acids such as formic, acetic, phenylacetic, propionic, t-butylacetic, valeric, caproic and the like.

The term alkyl includes hydrocarbon radicals containing up to six carbon atoms and, preferably, up to four carbons including methyl, ethyl, n-propyl, isopropyl, n-butyl, sec.-butyl and t-butyl.

The aminoestratrienes of the general formula possess estrogenic activity as well as anti-gonadotropic and anti-androgenic properties. They are thus useful as a pituitary gonadotrophin inhibitor in relieving menopausal symptoms as well as treating conditions such as arteriosclerosis. In addition, acyl compounds such as 3-(N-acetylamino)-1,3,5(10)-estratriene-17β-ol 17-acetate possess analgesic properties. Our novel aminoestratrienes can be administered orally to the animal organism in conventional dosage forms such as pills, capsules, tables, syrups or elixirs; or by injection in liquid forms adaptable for steroid administration. The salts of the compounds of our invention advantageously are water soluble thus making them particularly valuable as drugs via both the oral and parenteral routes.

Of the novel compounds encompassed by the general formula, the preferred group are those wherein at least one of $R_1$ and $R_2$ are acetyl. The novel 3-aminoestratrienes while being therapeutically active are also useful as intermediates in preparing the preferred 3-(N-acylamino)- and 3(N,N-diacylamino)-estratrienes.

Our novel 3-aminoestratrienes may be prepared either through the rearrangement of an oxime of a 3-keto-Δ⁴-19-nor steroid such as 19-nortestosterone or through the reaction of a 10-quinol acetate such as 10ξ-acetoxy-1,4-estradiene-3,17-dione with benzylamine. In the former process, 19-nortestosterone, for example, is converted to 19-nortestosterone oxime according to known procedures utilizing hydroxylamine hydrochloride. The 19-nortestosterone oxime intermediate is then converted to a 3-amino-aromatic A-ring steroid of our invention by reaction at elevated temperatures (usually at reflux) with a lower alkanoic acid anhydride such as acetic anhydride to give 3(N-acetylamino)-1,3,5(10)-estratriene-17β-ol 17-acetate, a novel compound of our invention By subjecting the 3-(N-acetylamino)-estratriene thus obtained to strong acid hydrolysis such as that utilizing sulfuric acid followed by neutralization of the amine acid salt thereby formed, there is obtained 3-amino-1,3,5(10)-estratriene-17β-ol.

When other lower alkanoic acid anhydrides such as propionic or butyric anhydrides are substituted for acetic anhydride in the aforementioned procedure, 19-nortestosterone oxime is converted to the corresponding 3-(N-acylamino)-estratriene, i.e. 3-(N-propionylamino)-1,3,5 (10)-estratriene-17β-ol 17-propionate and 3-(N-butyrylamino)-1,3,5(10)-estratriene-17β-ol 17-butyrate, respectively.

According to our process, the 3-oxime of any 3-keto-Δ⁴-19-nor steroid may similarly be boiled with a lower alkanoic acid anhydride and there will be obtained the corresponding 3-(N-acylamino) - 1,3,5(10)-tridehydro steroid. For example, 19-norethisterone (17α-ethinyl-19-nor-4-androstene-17β-ol-3-one) when reacted with hydroxylamine hydrochloride gives 19-nor-ethisterone oxime which upon reaction with acetic anhydride according to our process yields a novel compound of our invention, 3-(N-acetylamino) - 17α - ethinyl-1,3,5(10)-estratriene-17β-ol 17-acetate. Similarly, 17α-ethyl-19-nortestosterone is converted to 17α-ethyl-19-nortestosterone oxime which is boiled with acetic anhydride to give the novel 3-(N-acetylamino)-17α-ethyl,1,3,5(10)-estratriene-17β-ol 17-acetate. Strong acid hydrolysis of each of the aforementioned tertiary alcohols followed by neutralization with a weak base such as sodium carbonate yields the corresponding free amine, i.e. 3-amino-17α-ethinyl-1,3,5 (10)-estratriene-17β-ol and 3-amino-17α-ethyl-1,3,5(10)-estratriene-17β-ol.

Alternatively, according to our process indicated below wherein are prepared the novel 3-aminoestratrienes of this invention, an amino group is introduced at the 3-carbon of a steroidal 3-keto-quinol acetate such as 10ξ-acetoxy-1,4-estradiene-3,17-dione (II) by condensation with a primary amine, preferably benzylamine. An intermediary Schiff base (III) is formed which rearranges with the loss of acetic acid yielding a second intermediary Schiff base (IV), which, upon acid hydrolysis followed by neutralization of the amine acid salt thereby formed, yields a 3-aminoestratriene of our invention, 3-amino-1,3,5(10)-estratriene-17-one, I′.

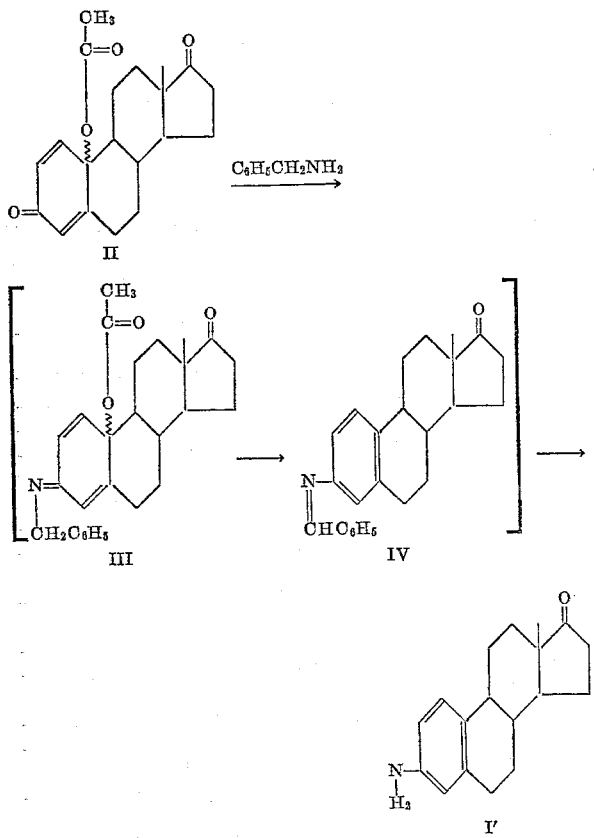

In actual practice, the intermediary bases III and IV are not necessarily isolated. The quinol acetate II and an excess of primary amine are refluxed together for a period of from one to four hours (when benzylamine is used, preferably about 2½ hours). The intermediary Schiff base thus obtained need not be isolated but is hydrolyzed by heating the reaction mixture in the presence of an acid such as sulfuric acid. The amine salts thereby formed are conveniently neutralized by making the reaction mixture basic with sodium bicarbonate, for example, and extracting the novel amine product (I′) with an organic solvent such as methylene chloride.

Although benzylamine is preferred in carrying out our inventive process, other primary amines may be used such as those of the general formula

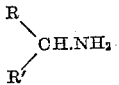

wherein R and R′ may be alike or dissimilar and at least one of the substituents R and R′ is phenyl, p-chlorophenyl, or other similar aromatic residues. When R and R′ are not alike the dissimilar substituent may be hydrogen or an alkyl residue such as methyl, ethyl and the like. Other amines which may be used in our process are those containing a carbonyl group on the carbon alpha to the amine group, for example, aminoacetone

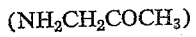

and aminoacetamide ($NH_2CH_2CONH_2$). The amines of choice for our reaction are those possessing at least one hydrogen alpha to the nitrogen activated by a benzene ring, because the ease with which the intermediate III will lose acetic acid is determined partly upon the ease with which an α-hydrogen atom can be extracted from the Schiff base III.

Our novel process whereby steroidal quinol acetates are converted to amine analogs of estrone and estradiol may be carried out in the presence of a solvent. Aside from the consideration of solubility, the solvating medium preferably boils in the range of 100° C. to 200° C. Benzylamine is both the amine and solvent of choice in preparing the novel 3-amino steroids not only because of its high boiling point (187° C.), its high basicity, and relatively unhindered nature, but also because of the activation by the phenyl group of the hydrogen atoms alpha to the nitrogen. Other solvents which may be used are xylene or durene.

The starting compound, 10ξ-acetoxy-1,4-estradiene-3,17-dione mentioned above was used for illustrative purposes. Other 10ξ-acetoxy steroidal quinols may be used as starting compounds such as 10ξ-acetoxy-1,4-estradiene-17β-ol-3-one, 10ξ-acetoxy-17α-methyl-1,4-estradiene-17β-ol-3 - one, 10ξ-acetoxy-17α-ethinyl-1,4-estradiene-17β-ol-3-one and the 17-esters thereof. These starting compounds are prepared from their corresponding 3-hydroxy-1,3,5(10)-estratrienes by oxidation with lead tetra-acetate as described by Gold and Schwenk in J. Am. Chem. Soc. 80, 5683 (1958). Thus, estrone (1,3,5(10)-estratriene-3-ol-17-one) when oxidized with lead tetra-acetate in acetic acid yields 10ξ-acetoxy-1,4-estradiene-3,17-dione (compound II). In like manner, estradiol (1,3,5(10)-estratriene-3,17β-diol), 17α-methyl-1,3,5(10)-estratriene-3,17β-diol, and the like, when reacted with lead tetra-acetate and acetic acid are converted to 10ξ-acetoxy-1,4-esteradiene-17β-ol-3-one and 10ξ-acetoxy-17α-methyl-1,4-estradiene-17β-ol-3-one, respectively.

Although the 10ξ-acetoxy-1,4-diene-3-one steroids described above are the starting compounds of choice, the corresponding 10ξ-hydroxy steroid or other 10-lower alkanoic acid esters thereof may also be used as intermediates for our novel process. The 10ξ-hydroxy steroids, for example, 10ξ-hydroxy-1,4-estradiene-3,17-dione, are obtained from the corresponding 10ξ-acetates by means of an alkali metal alcoholate such as sodium methoxide in methanol as described by Gold and Schwenk supra. Other lower alkanoyl ester intermediates such as 10ξ-propionyloxy-1,4-estradiene-3,17-dione are prepared by the oxidation of a starting material such as 3-hydroxy-1,3,5(10)-estratriene-17-one in the same manner as are the 10ξ-acetoxy compounds by replacing lead tetra-acetate by the corresponding lead salt of propionic acid or by the use of propionic acid together with lead oxide. Other alkanoic acids such as caproic or valeric can be used in the place of propionic acid.

Although the 17α-methyl-17β-hydroxy and 17α-ethinyl-17β-hydroxyestratrienes of our invention may be prepared from the corresponding 17 - substituted-10ξ - acetoxy-1,4-estradiene intermediates or from the oximes of 17α-methyl-19-nortestosterone and 17α-ethinyl-19-nortestosterone according to the heretofore described processes, it is preferred to introduce these groups following the introduction of the 3-amino group into the molecule. Thus, the 17α-methyl-17β-hydroxy-3-aminoestratrienes of the general formula are prepared from 3-amino-1,3,5,(10)-estratriene-17-one (or an N-substituted derivative thereof) in conventional manner with, for example, an alkyl lithium reagent such as methyl lithium in ether at low temperatures or with a Grignard reagent such as methyl magnesium iodide in ether.

The 17-keto-3-aminoestratrienes are also convertible to the 17α-ethinyl-17β-hydroxy derivatives. In particular, the 17-keto group is transformable into the 17α-ethinyl-17β-hydroxy function by reaction with sodium acetylide in liquid ammonia.

Our 17-hydroxy-aminoestratrienes are also convertible to the 17α-ethinyl-17β-hydroxy and 17α-methyl-17β-hydroxy analogs by first oxidizing the 17β-hydroxy group to 17-keto in a conventional manner and then proceeding as above.

The N-substituted derivatives of our invention are prepared from the corresponding 3-aminoestratrienes by using conventional reactions. Thus, treatment of 3-amino- 1,3,5(10)-estratriene-17β-ol with methyl iodide, in an insert solvent, for example, yields either 3-(N-methylamino)-1,3,5(10)-estratriene-17β-ol or 3-(N,N-dimethylamino)-1,3,5(10)-estratriene-17β-ol depending on the amount of methyl iodide used and the length of the reaction time.

In a similar fashion, the N-benzyl derivatives of our invention, such as 3-(N-benzylamino)-1,3,5(10)-estratriene-17β-ol is obtained by reacting the free amino compound, e.g. 3-amino- 1,3,5(10)-estratriene-17β-ol, with a benzylhalogenide in conventional manner, or by reduction of the Schiff base IV as obtained by heating 10ξ-acetoxy - 1,4 - estratriene - 17β-ol-3-one with benzylamine as heretofore described, omitting the subsequent treatment with acid.

The N-acyl derivatives are conveniently prepared from the corresponding 3-aminoestratrienes by reaction with an acid anhydride or chloride in the presence of pyridine. For example, 3-amino-1,3,5(10)-estratriene-17-one when reacted with acetic anhydride and pyridine yields 3-(N-acetylamino)-1,3,5(10)-estratriene-17-one. Any free hydroxyl groups which may be present are also esterified under these reaction conditions. Thus, 3-amino-1,3,5(10)-estratriene-17β-ol when reacted with acetic anhydride and pyridine is converted to 3 - (N - actylamino) - 1,3,5(10)-estratriene-17β-ol 17-acetate.

Acetic anhydride may be replaced by anhydrides of other acids in the above procedures and the corresponding N-acyl derivatives are obtained. Thus, pyridine in conjunction with an acid anhydride such as butyric anhydride or benzoyl chloride when reacted with a 3-aminoestratriene of formula I will form the corresponding 3-(N-acylamino)-estratriene, i.e. a 3-(N-butyrylamino) and 3-(N-benzoylamino)-estratriene, respectively.

By changing the amounts of reactants in the above described procedures and modifying reaction conditions such as temperature and length of reaction time, one can obtain either a mono- or di-N-acyl or N-alkyl derivative, whichever is desired.

Convenient methods of obtaining an estratriene of our invention possessing a 3-N-acyl and a 17-hydroxy group are by treating the free 3-amine with an acid, formic acid, thus forming a 3-(N-formylamino)-17-hydroxyestratriene for example, or by shaking an aqueous suspension of the 3-amino derivative with an acid anhydride such as acetic anhydride to obtain a 3-(N-acetylamino)-17-hydroxyestratriene. For example, 3-amino-17α-ethinyl-1,3,5(10)-estratriene-17β-ol reacted with aqueous acetic anhydride yields 3-(N-acetylamino)-17α-ethinyl - 1,3,5(10)-estratriene-17β-ol.

Novel 3-aminoestratrienes of our invention wherein the hydrogens of the amino group are replaced by dissimilar groups neither of which is hydrogen, such as in 3-(N-benzyl-N-acetylamino)-1,3,5(10) - estratriene - 17β-ol 17 - acetate are obtained by adding the appropriate reagent to a monosubstituted derivative. For example, by reacting an N-monosubstituted aminoestratriene such as 3-(N-benzylamino)-1,3,5(10)-estratriene-17β-ol with acetic anhydride in pyridine there is obtained 3-(N-benzyl-N-acetylamino)-estratriene-17β-ol 17-acetate.

Acid addition salts of the 3-aminoestratrienes of the general formula such as the phosphoric acid salt, the sulfuric acid salt or the hydrochloric acid salt of 3-amino-1,3,5(10) - estratriene - 17β - ol, are conveniently prepared from the corresponding free amine according to known techniques. For example, an equimolar quantity of anhydrous hydrogen chloride in methanol added to a methanolic solution of 3 - amino-1,3,5(10) - estratriene - 17β-ol yields the novel 3-amino-1,3,5(10)-estratriene-17β-ol hydrochloric acid salt.

The following examples are illustrative of methods by which the novel compounds of our invention may be made and are not to be construed as limiting the scope of the invention, the scope of our invention being defined by the appended claims.

This application is a division of copending application Serial No. 24,915, filed April 27, 1960.

EXAMPLE 1

3-Amino-1,3,5(10)-Estratriene-17-One

A solution of 0.5 g. of 10ξ-acetoxy-1,4-estradiene-3,17-dione in 5 ml. of benzylamine is refluxed for 2½ hours. Most of the benzylamine is removed from the reaction mixture by warming in a stream of nitrogen and the residue is then refluxed with 50 ml. of 2 N sulfuric acid for two hours. The reaction mixture is then cooled, extracted with ether, made alkaline with solid sodium carbonate and then extracted with methylene chloride. The latter organic extracts are combined, dried over sodium sulfate and evaporated to a residue. Ten ml. of cyclohexane is added to the residue and left at room temperature for a short time. The crystalline precipitate separates and is filtered and sublimed at 140° C. (0.01 mm.). The resulting white powder is recrystallized several times from benzene-cyclohexane to yield 3-amino-1,3,5(10)-estratriene-17-one, M.P. 192–192.6° C.

$\lambda_{max.}^{MeOH}$ 238 mμ (9,100), 292 mμ (1,900) $[\alpha]_D^{25}+60_3$ (chloroform)

*Analysis.*—Calcd. for $C_{18}H_{22}ON_3$; N, 5.20. Found: N, 5.62.

EXAMPLE 2

3-(N-Acetylamino)-1,3,5(10)-Estratriene-17-One

To a solution of 80 mg. of 3-amino-1,3,5(10)-estratriene-17-one (the compound of Example 1) in 1 ml. of pyridine, there is added 0.2 ml. of acetic anhydride and the mixture is allowed to stand at room temperature for one hour. Water (10 drops) is added and after one hour 10 ml. of 2 N sulfuric acid is added. A precipitate is formed which is filtered, washed with water and recrystallized from aqueous methanol to give a product which is sublimed at 195° C. (0.02 mm.) and is recrystallized twice from aqueous methanol to give 3-(N-acetylamino)-1,3,5(10)-estratriene-17-one, M.P. 255–256° C.

$\lambda_{max.}^{MeOH}$ 247 mμ (15,500), 289 mμ (1,100) $[\alpha]_D^{23}+161°$ (dimethylformamide)

*Analysis.*—Calcd. for $C_{20}H_{25}O_2N$: C, 77.13; H, 8.09; N, 4.50. Found: C, 77.43, 77.61; H, 8.12, 8.24; N, 4.59.

In a similar manner, by substituting other lower alkanoic acid anhydrides such as caproic anhydride and propionic anhydride for acetic anhydride in the above procedure the corresponding 3 - (N - acylamino) - estratrienes are obtained, i.e. 3-(N-caproylamino)-1,3,5(10)-estratriene-17-one and 3-(N-propionylamino)-1,3,5(10)-estratriene-17-one, respectively.

EXAMPLE 3

3-Amino-1,3,5(10)-Estratriene-17β-Ol

A. THE SULFURIC ACID SALT OF 3-AMINO-1,3,5(10)-ESTRATRIENE-17β-OL

A solution of 0.30 g. of 10ξ-acetoxy-17β-hydroxy-1,4-estradiene-3-one in 3 ml. of benzylamine is refluxed for two hours. From the reaction mixture the benzylamine is evaporated in a stream of nitrogen. To the resultant residue is added 5 ml. of 2 N sulfuric acid and 25 ml. of water and the mixture distilled to half the original volume. The residue from this distillation is refluxed for 1½ hours, then cooled. A precipitate separates which is isolated by filtration, washed with water and dry ether, dried and recrystallized three times from methanol to give the sulfuric acid salt of 3-amino-1,3,5(10)-estratriene-17β-ol which decomposes at 320° C.

*Analysis.*—Calcd. for $C_{18}H_{25}ON \cdot \frac{1}{2}H_2SO_4$: N, 4.37; S, 4.99. Found: N, 4.32; S, 5.10.

B. 3-AMINO-1,3,5(10)-ESTRATRIENE-17β-OL

The sulfate salt in Example 3A is shaken with benzene and aqueous sodium carbonate solution until dissolved. The aqueous layer is separated and the benzene solution dried over sodium sulfate and evaporated to a residue which is crystallized from benzene-cyclohexane to give 3-amino-1,3,5(10)-estratriene-17β-ol, M.P. 143° C.

$\lambda_{max.}^{MeOH}$ 237 mμ (7,900), 292 mμ (1,500) $[\alpha]_D^{21}$ +71° (chloroform)

EXAMPLE 4

Hydrochloric Acid Salt of 3-Amino-1,3,5(10)-Estratriene-17β-Ol

To 3-amino-1,3,5(10)-estratriene-17β-ol (the compound of Example 2) in methanol is added an equimolar quantity of anhydrous hydrogen chloride in methanol. Water is added and a precipitate results which is crystallized from methanol-water three times and finally with anhydrous methanol to give the hydrochloric acid salt of 3-amino-1,3,5(10)-estratriene-17β-ol, M.P. 274° C.

*Analysis.*—Calcd. for $C_{18}H_{25}ON·HCl$: C, 70.22; H, 8.51; N, 4.55; Cl, 11.53. Found: C, 70.32, H, 8.58; N, 4.00; Cl, 11.61.

EXAMPLE 5

3-(N-Acetylamino-1,3,5(10)-Estratriene-17β-Ol 17-Acetate

A. 19-NORTESTOSTERONE OXIME

To a solution of 2.42 g. of 19-nortestosterone in 30 ml. of methanol is added a solution of 1.86 g. of hydroxylamine hydrochloride and 5 g. of sodium acetate hydrate in 10 ml. of water. The mixture is refluxed on the steam bath for three hours and the methanol evaporated until the reaction mixture is a saturated solution. The solution is seeded and slowly cooled. The resulting precipitate is filtered and dried in vacuo to give 19-nortestosterone oxime which is used without further purification in the following procedure.

B. (N-ACETYLAMINO)-1,3,5(10)-ESTRATRIENE-17β-OL 17-ACETATE

The crude oxime as prepared in Example 5A is refluxed for three hours with 25 ml. of acetic anhydride and then is poured into 250 ml. of cold water. The mixture is allowed to stand for one hour with occasional stirring and then is extracted with chloroform. The organic extracts are combined, washed with water and potassium bicarbonate solution, dried over sodium sulfate and evaporated to a residue which is chromatographed on 80 g. of neutral alumina. The material is introduced onto the column in a benzene solution and eluted with 500 ml. each of benzene, 10% chloroform-benzene and 30% chloroform-benzene. The eluate is collected in 250 ml. fractions which are distilled to dryness in vacuo. The crystalline fractions are combined, dissolved in 30 ml. of hot benzene and 30 ml. of cyclohexane added. The solution is heated to boiling, then cooled. A precipitate results which is filtered, dried and recrystallized from anhydrous methanol to give 3-(N-acetylamino)-1,3,5(10)-estratriene-17β-ol-17-acetate, M.P. 207.5–209.8° C.

$\lambda_{max.}^{MeOH}$ 249 mμ (15,000) inflection at (273 mμ); $[\alpha]_D^{24}$ +15° (chloroform)

*Analysis.*—Calcd. for $C_{22}H_{29}O_3N$: C, 74.33; H, 8.22; N, 3.94. Found: C, 74.27; H, 8.29; N, 3.92.

Alternatively, the compound of this example is prepared by the following procedure.

C. 3-(N-ACETYLAMINO)-1,3,5(10)-ESTRATRIENE-17β-OL 17-ACETATE

To 10 mg. of 3-amino-1,3,5(10)-estratriene-17β-ol (the compound of Example 3) is added 0.5 ml. of pyridine and 0.1 ml. of acetic anhydride. The reaction mixture is allowed to stand at room temperature for two hours. Water is added and after one hour 10 ml. of 2 N sulfuric acid is added. A precipitate forms which is filtered, washed with water, recrystallized from aqueous methanol, then sublimed at 195° C. (0.02 mm.) to yield a solid product which is recrystallized from methanol and dried at 100° C. in vacuo to give 3-(N-acetylamino)-1,3,5(10)-estratriene-17β-ol 17-acetate, M.P. 210–214° C. (There is no depression in the melting point taken of a mixture of the product produced by procedure C with that of procedures A and B.)

EXAMPLE 6

3-(N-Caproylamino)-1,3,5(10)-Estratriene-17β-Ol-17-Caproate 3-amino-1,3,5(10)-estratriene-17β-ol (the compound of Example 3) is reacted with caproic acid anhydride and pyridine in a manner similar to that described in Example 5C. The resultant product is isolated in the described manner and crystallized from aqueous methanol to give 3-(N-caproylamino)-1,3,5(10)-estratriene-17β-ol 17-caproate.

EXAMPLE 7

3-Amino-17α-Ethinyl-1,3,5(10)-Estratriene-17β-Ol 300 mg. of potassium is dissolved with stirring in 100 ml. of liquid ammonia in a dry atmosphere. A stream of acetylene is passed into the stirred cold solution until absorption is complete and the color has changed completely. While continuing a slow stream of acetylene, a solution of 500 mg. of 3-amino-1,3,5(10)-estratriene-17-one (the compound of Example 1) in 10 ml. of dry tetrahydrofuran is added dropwise. After the addition is complete, the mixture is stirred for two hours after which, 1 ml. of water is carefully added dropwise to decompose any excess reagent. The solution is then allowed to evaporate by warming to room temperature followed by evaporation in vacuo. The resulting residue is crystallized from ethanol to give 3-amino-17-α-ethinyl-1,3,5(10)-estratriene-17β-ol.

EXAMPLE 8

3-Amino-17α-Methyl-1,3,5(10)-Estratriene-17β-Ol

To a solution of 500 mg. of 3-amino-1,3,5(10)-estratriene-17-one (the compound of Example 1) in 5 ml. of dry anisol under an atmosphere of nitrogen, there is added with stirring a solution of 1.1 g. of methyl magnesium iodide in 5 ml. of ether. The addition is maintained dropwise at such a rate that the heat generated maintains the reaction mixture at reflux temperature. After the addition is complete, the mixture is refluxed with stirring for two hours. The mixture is then cooled and a saturated solution of aqueous ammonium chloride added. The aqueous layer is separated and the organic solution is washed with water to neutrality, dried over magnesium sulfate, filtered and evaporated in vacuo to a residue which is crystallized from acetone-hexane to give 3-amino-17α-methyl-1,3,5(10)-estratriene-17β-ol.

EXAMPLE 9

3-(N-Dimethylamino)-1,3,5(10)-Estratriene-17β-Ol

To a solution of 500 mg. of 3-amino-1,3,5(10)-estratriene-17β-ol (the compound of Example 3) in 4 ml. of dry tetrahydrofuran and 2 ml. of methanol is added 1 g. of sodium carbonate. Three ml. of methyl iodide is added in three portions and the mixture is refluxed for two hours with stirring then concentrated in vacuo. Water is added to the resultant residue. A precipitate forms which is filtered and crystallized from methanol to give 3-(N-dimethylamino)-1,3,5(10)-estratriene-17β-ol.

EXAMPLE 10

3-(N-Benzylamino)-1,3,5(10)-Estratriene-17β-Ol

To a solution of 3-amino-1,3,5(10)-Estratriene-17β-ol (the compound of Example 3) in 5 ml. of dry tetrahydrofuran is added 4.5 ml. of benzyl bromide. The mixture is stirred and refluxed for one hour and evaporated in vacuo to a residue which is triturated with aqueous sodium bicarbonate solution. The resultant solid is collected by filtration and crystallized from aqueous acetone to give 3-(N-benzylamino)-1,3,5(10)-estratriene-17β-ol.

EXAMPLE 11

3-(N-Methylamino)-1,3,5(10)-Estratriene-17β-ol

To a solution of 500 mg. of 3-amino-1,3,5(10)-estratriene-17β-ol (the compound of Example 3) in 50 ml. of dry tetrahydrofuran is added 4 ml. of methyl iodide. The mixture is stirred and refluxed for one hour and then evaporated in vacuo to a residue which is triturated with aqueous sodium bicarbonate solution. The resultant solid is collected by filtration and crystallized from methanol to give 3-(N-methylamino)-1,3,5(10)-estratriene-17β-ol.

EXAMPLE 12

3-(N-Acetylamino)-17α-Methyl-1,3,5(10)-Estratriene-17β-ol 17-Acetate

In a manner similar to that described in Example 5C, 3 - amino-17α-methyl-1,3,5(10)-estratriene-17β-ol (the compound of Example 8) is reacted with acetic anhydride and pyridine and the resultant product isolated and purified to give 3-(N-acetyl-amino)-17α-methyl-1,3,5(10)-estratriene-17β-ol 17-acetate.

EXAMPLE 13

3-(N-Benzyl-N-Acetylamino)-1,3,5(10)-Estratriene-17β-ol 17-Acetate

In a manner similar to that described in Example 5C, 3-(N-benzylamino)-1,3,5(10)-estratriene-17β-ol (the compound of Example 10) is reacted with acetic anhydride and pyridine to give 3-(N-benzyl-N-acetylamino)-1,3,5(10)-estratriene-17β-ol 17-acetate.

EXAMPLE 14

3-(N-Methyl-N-Acetylamino)-1,3,5(10)-Estratriene-17β-ol 17-Acetate

In a manner similar to that described in Example 5C, 3-(N-methylamino)-1,3,5(10)-estratriene-17β-ol (the compound of Example 11) is reacted with acetic anhydride and pyridine to give 3-(N-methyl-N-acetylamino)-1,3,5(10)-estratriene-17β-ol 17-acetate.

EXAMPLE 15

3-(N-Acetylamino)-17α-Ethinyl-1,3,5(10)-Estratriene-17β-ol 17-Acetate

A. 17α-ETHINYL-19-NORTESTOSTERONE OXIME

In the manner described in Example 5A, 17α-ethinyl-19-nortestosterone is reacted with hydroxylamine hydrochloride and sodium acetate. The resultant product is isolated in the described manner to give 17α-ethinyl-19-nortestosterone oxime.

B. 3-(N-ACETYLAMINO)-17α-ETHINYL-1,3,5(10)ESTRATRIENE-17β-OL 17-ACETATE

In the manner described in Example 5B, 17α-ethinyl-19-nortestosterone oxime is reacted with acetic anhydride. The resultant product is isolated and purified as described to give 3-(N-acetylamino)-17α-ethinyl-1,3,5(10)-estratriene-17β-ol 17-acetate.

Alternatively, the compound of this example is prepared as follows:

To 10 mg. of 3-amino-17α-ethinyl-1,3,5(10)-estratriene-17β-ol (the compound of Example 7) is added 0.5 ml. of pyridine and 0.1 ml. of acetic anhydride. The reaction mixture is left overnight at room temperature. Water is added and after one hour 10 ml. of 2 N sulfuric acid is added. A precipitate forms which is filtered, washed with water and recrystallized from aqueous methanol to give 3 - N - acetylamino-17α-ethinyl-1,3,5(10)-estratriene-17β-ol 17-acetate.

EXAMPLE 16

3-(N-Benzoylamino)-17α-Methyl-1,3,5(10)-Estratriene-17β-ol 10 mg. of 3-amino-17α-methyl-1,3,5(10)-estratriene-17β-ol (the compound of Example 8) is reacted with 0.1 ml. of benzoyl chloride and 0.5 ml. of pyridine in a manner similar to that described in Example 5C. The resultant product is isolated in the described manner to give 3-(benzoylamino)-17α-methyl-1,3,5(10)-estratriene-17β-ol.

EXAMPLE 17

3-(N-Methyl-N-Benzylamino)-1,3,5(10)-Estratriene-17-One

A. 3-(N-METHYLAMINO)-1,3,5(10)-ESTRATRIENE-17-ONE

In a manner similar to that described in Example 11, 3-amino-1,3,5(10)-estratriene-17-one (the compound of Example 1) is reacted with methyl iodide in tetrahydrofuran to give 3-(N-methylamino)-1,3,5(10)-estratriene-17-one.

B. 3-(N-METHYL-N-BENZYLAMINO)-1,3,5(10)-ESTRATRIENE-17-ONE

In a manner similar to that described in Example 10, 3-(N-methylamino)1,3,5(10)-estratriene-17-one in tetrahydrofuran is reacted with benzyl iodide. The resultant product is isolated and purified as described to give 3-(N-methyl-N-benzylamino)-1,3,5(10)-estratriene-17-one.

EXAMPLE 18

3-(N-Diacetylamino)1,3,5(10)-Estratriene-17-One

To a solution of 800 mg. of 3-amino-1,3,5(10)-estratriene-17-one (the compound of Example 1) in 2 ml. of pyridine, there is added 1 ml. of acetyl chloride and the mixture is allowed to stand overnight at room temperature. Water is added and after one hour, 10 ml. of 2 N sulfuric acid is added. A precipitate forms which is filtered, washed with water and recrystallized from aqueous methanol to give 3-(N-diacetylamino)-1,3,5-(10)-estratriene-17-one.

We claim:

1. In the process of preparing compounds of the group consisting of estratriene derivatives of the following formula and the pharmaceutically acceptable acid addition salts thereof;

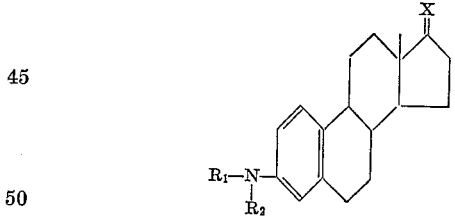

wherein X is a member of the group consisting of O, (H, βOZ), (α-methyl,βOZ) and (α-ethinyl,βOZ) wherein Z is a member of the group consisting of H and an acid radical of a hydrocarbon carboxylic acid having up to eight carbon atoms; and $R_1$ and $R_2$ are members of the group consisting of H, lower alkyl, benzyl and an acid radical of a hydrocarbon carboxylic acid having up to eight carbon atoms, the steps which comprise heating together at elevated temperatures a lower alkanoic acid anhydride and an oxime of the following formula:

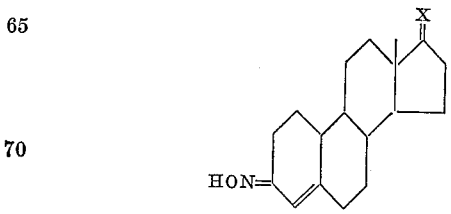

wherein X is as above defined, and isolating the 3-(N-lower alkanoylamino)-estratriene thereby formed, said 3-(N-lower alkanoylamino)-estratriene having the following formula:

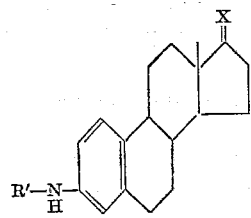

wherein Y is a member of the group consisting of O, (H,βOR'), (α-methyl,βOR') and (α-ethinyl,βOR') and R' is lower alkanoyl.

2. The process of claim 1 wherein the lower alkanoic acid anhydride is acetic anhydride.

3. The process which comprises heating at reflux temperature a mixture of 19-nortestosterone oxime and acetic anhydride, and isolating the 3-(N-acetylamino)-1,3,5 (10)-estratriene-17β-ol-17-acetate thereby formed.

No references cited.

UNITED STATES PATENT OFFICE
CERTIFICATE OF CORRECTION

Patent No. 3,060,205　　　　　　　　　　　　October 23, 1962

Erwin Schwenk et al.

It is hereby certified that error appears in the above numbered patent requiring correction and that the said Letters Patent should read as corrected below.

Column 11, lines 4 to 10, the structural formula should appear as shown below instead of as in the patent:

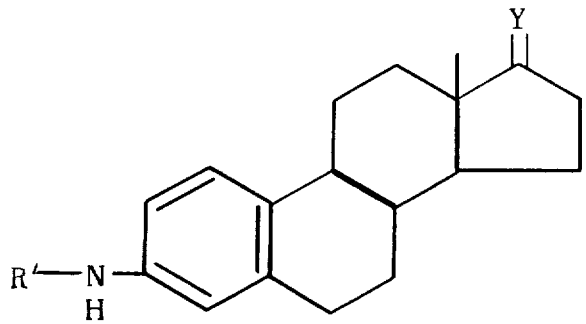

Signed and sealed this 19th day of March 1963.

(SEAL)
Attest:

ESTON G. JOHNSON　　　　　　　　　　　　　DAVID L. LADD
Attesting Officer　　　　　　　　　　　　Commissioner of Patents